3,111,472
**PROCESS OF CARRYING OUT ELECTROCHEMI-
CALLY ELECTROLYSIS**
Kenichi Oda, Masatoshi Yamawaki, and Takeo Saito, Tokyo-to, Japan, assignors to Zaidan-Hojin Noguchi Kenkyu-Jo, Tokyo-to, Japan
Filed Apr. 8, 1958, Ser. No. 727,070
Claims priority, application Japan Aug. 24, 1957
21 Claims. (Cl. 204—180)

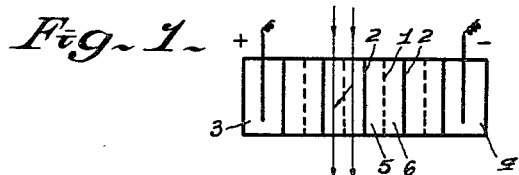
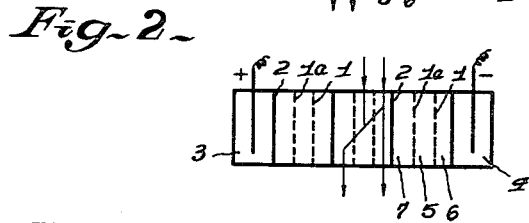
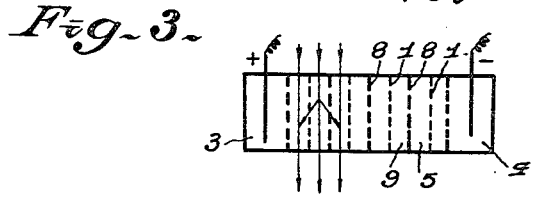
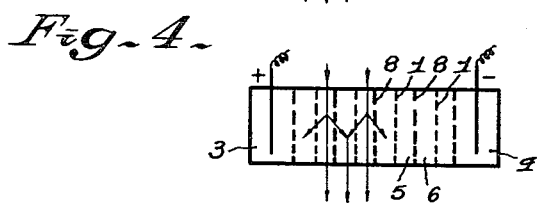
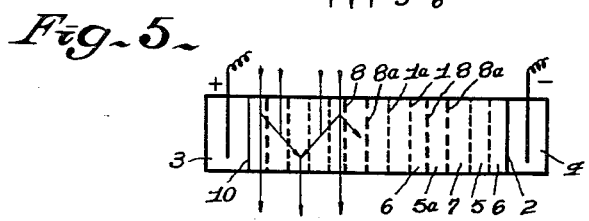
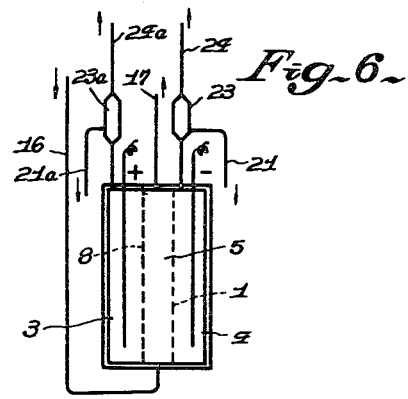
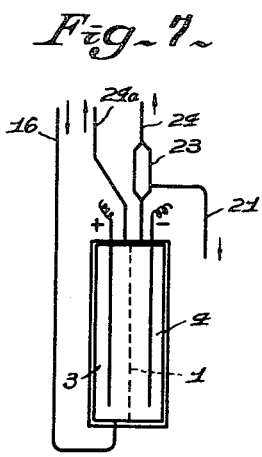
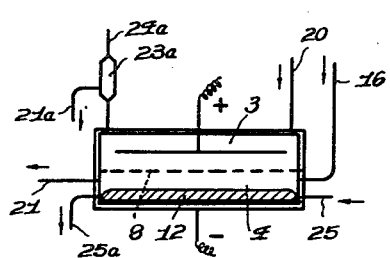

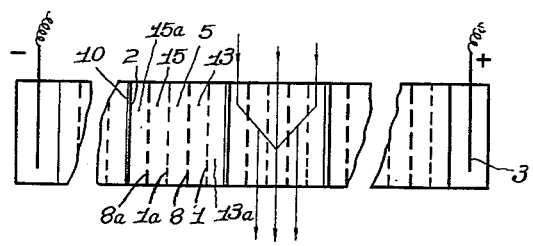
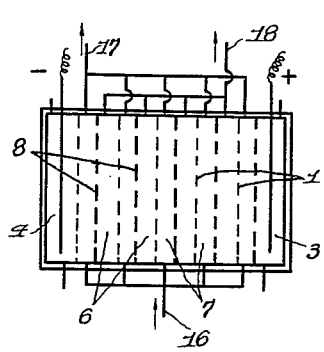
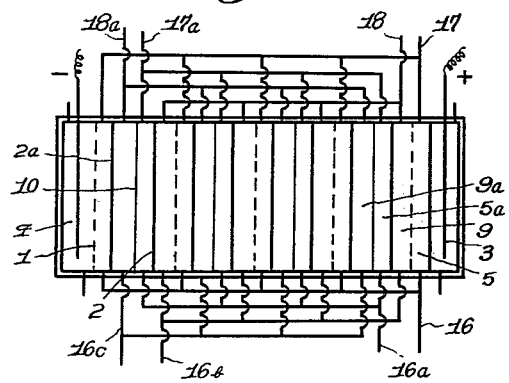
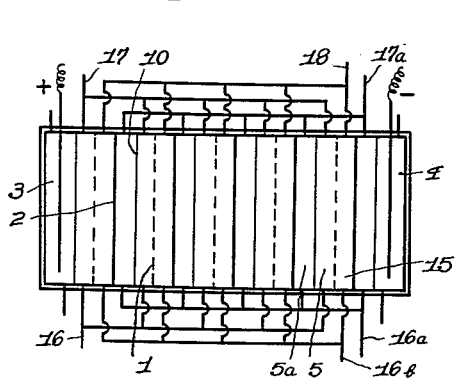
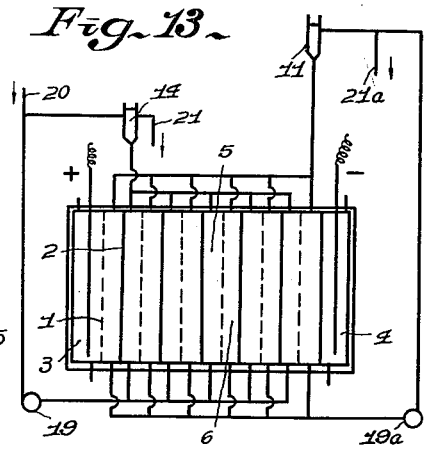

This invention relates to an electrochemical application of a micro-porous ion membrane having selective ion-permeability.

In Fortune, vol. 44, page 109, it is stated that ions of the same sign such as the Na ion and the K ion can be separated by electrodialysis. According to this article, separation of salts is carried out by arranging a plurality of cation exchange membranes to form a plurality of partitioned compartments, and by passing successively the mixed solution to be separated through said compartments in a direction opposite to that of the electrical migration of Na ions and K ions in the cation exchange membranes so as to widen the difference between the permeabilities of said Na ions and K ions through the cation exchange membranes. Such action of the series of cation exchange membranes is analogous to that of a plate column in fractional distillation.

Said process, however, cannot be industrially applied, because it necessitates the use of a plurality of ion exchange membranes which results in a loss of much energy.

Therefore, an object of this invention is to provide a process capable of carrying out the separation of ions of the same sign with a high separability, and with little loss of energy.

A further object of this invention is to apply the principle of this invention to various other electrochemical reactions which are carried out in cells consisting of two or more chambers partitioned by one or more barrier membranes.

Said objects of this invention have been attained by the use of particularly prepared micro-porous ion exchange membranes instead of the usual (non-porous) ion exchange membranes.

Among the micro-porous ion exchange membranes to be used in this invention are (1) membranes mainly comprising powders or fibers of ion exchange resins having uniformly dispersed holes through which water can pass freely, the diameter of said powder or fiber being selected so as to be from several $\mu$ to several hundreds $\mu$ and the diameter of said holes being selected so as to be above 1$\mu$, and (2) membranes consisting of sponge-like ion exchange material having many uniformly dispersed micro-pores and acting in the same manner as the first-mentioned membranes. The simplest process for the production of said micro-porous ion exchange membranes is the process which comprises the steps of preparing a mixture of fine powders of ion exchange resins and fine common salt acting as a pore forming agent, forming a sheet by molding said mixture with polyethylene or vinyl chloride acting as a binding agent, and dissolving out the common salt by treating it with water. In this process, as the micro-pore forming agent, may be used not only a water soluble salt such as common salt, but also any soluble material as long as its solvent can be removed to after-treatment. Furthermore, other nonconductive resins or other ion exchange resin such as a mixture of polyethyleneimine and epichlorhydrin may be used in place of polyethylene.

When an electrolyte is subjected to electrolysis while being passed through the pores of the micro-porous ion exchange membranes, as described above, a single layer of the fine ion exchange resin particles, in the ideal case, and several layers of said particles, in the practical case, can act in the same manner as one sheet of the ion exchange membrane used in the process described in the above-mentioned Fortune article. Accordingly, the micro-porous ion exchange membrane of this invention, the thickness of which is about 0.5 mm., can act in the same manner as several sheets of conventional ion exchange membranes.

Such a phenomenon is similar to the relation between a packed tower filled with small packing and a plate column in fractional distillation for the purpose of separating a volatile liquid mixture. The action of the flow of solution through the pores of the micro-porous ion exchange membrane is analogous to that of the reflux flowing down through the gaps of the packings in the distillation column. Therefore, the solution flowing through the pores is referred to as refluent solution in this description.

This invention relates to a process which comprises passing an electric current through a series of at least two compartments, each being divided by at least one micro-porous ion exchange membrane which has uniformly distributed fine pores capable of passing water therethrough by the hydraulic pressure difference, the voidage and permeability of said membranes being, respectively, selected so as to be between 40% and 10% and between 10 and 10,000 cc./dm.$^2$ hr. m. of water head, and passing the electrolyte solution through said compartments in the direction opposite to the leakage direction of ions or molecules, said leakage being due to incomplete permselectivity of the ion exchange resin composing said micro-porous ion exchange membrane.

The uniform distribution of said fine pores is indispensable for making the electrolytic liquid pass uniformly through the membrane. If said distribution of the fine pores is not uniform, the objects of this invention cannot be effectively attained.

According to the process of this invention, the separation of salts is caused by an electric current conducted through the ion exchange resin. Therefore, the current conducted through the holes is ineffective for said separation or is sometimes poorly effective for said separation. Accordingly, the membrane having a large voidage is unsuitable for embodying this invention. The maximum amount of said voidage is usually 40%. The smaller the diameter of each of the ion exchange resin particles, the more effective the separation will be, but excessively fine powders cannot be used, because the micro-pores formed between fine powders become too small, resulting in ineffective passing of water through said pores. Accordingly, the particle diameter of the ion exchange resin suitable for carrying out the process of this invention is from several $\mu$ to several hundreds $\mu$ and more particularly about several decades of $\mu$, and the diameter of the micro-pore forming agent is selected to be the same size as described above or slightly smaller. Of course, the fine pores must be uniformly distributed.

A further important feature of this invention is to make an electrolytic solution flow backward through the pores of the micro-porous ion exchange membrane. Generally, the amount of the refluent solution is selected so as to be in inverse proportion to the concentration of said solution and in direct proportion to the density of the electric current employed. Moreover, the water permeability of the membrane to be used is selected so that the electrolytic solution can permeate the membrane at a rate of 10–10,000 cc. per dm.$^2$ per hour under the pressure of a water head of 1 meter.

However, since the above range corresponds to the case in which the current density is within the range between 1 and several amperes per dm.$^2$; when a current density differing substantially from said range is adopted, said water permeability must be varied in accordance with said current density.

The principle of this invention can be applied to electrolysis in two compartments partitioned by one sheet of the micro-porous ion exchange membrane, but in many cases it is preferable to use an electrolytic cell having multicompartments partitioned by a plurality of the micro-porous ion exchange membranes combined with or without the usual ion exchange membranes.

The above-mentioned facts have been found by us and the various electromechanical reactions can be effectively carried out by the use of the micro-porous ion exchange membranes.

The so-called relative transport number R of K ions in a solution containing Na ions and K ions is represented by the following equation:

$$R = t_c C_r / t_r C_c$$

$t_c$: transport number of K ions through the membrane,
$t_r$: transport number of Na ions through the membrane,
$C_r$: concentration of K ions in the solution,
$C_c$: concentration of Na ions in the solution.

In the usual membrane made of cation exchange resin containing the sulphonic acid or carboxylic acid radical, the relative transport number of K ions is about 1.5.

In the process described in the Fortune, vol. 44, article, the separation of Na ions and K ions is effected by utilizing the difference of said transferring rate, but said separation can be effectively improved by the use of micro-porous cation ion exchange membranes.

In the process of this invention, the electrolysis is carried out by passing the water solution containing Na ions and K ions in the direction opposite to that of the cation migrated by the electric current through the micro-porous ion exchange membranes consisting substantially of the cation exchange resin through which K ions can migrate more easily than Na ions. By direct current, K ions are transferred more easily than Na ions and a portion of said transferred ions is passed in the direction opposite to that of the direct current, whereby enrichment of K ions can be achieved. Such an action of this invention as just described is similar to the action of the process described in the above-mentioned Fortune, vol. 44, article, but the latter process necessitates many membranes and the process of this invention necessitates only one sheet of the membrane.

In the same manner as described above, many kinds of cations other than Na ions and K ions or many kinds of anions in a solution can be separated, particularly, H ions and other cations (for example, in the mixed solution of sulphuric acid and iron sulphate) or OH ions and other anions (for example, in the mixed solution of caustic soda and common salt) can be separated easily, because these relative transport numbers differ substantially from unity.

The characteristic point of the present invention consists in carrying out the electroyltic separation of salts while making the electrolytic solution flow through the pores of the micro-porous ion exchange membranes.

Such separation can be carried out not only in the case where there is a difference in electroosmosis of ions inside the ion exchange resin, but also in the case where there is a difference in electroosmosis in the ion exchange resin. That is to say, this invention can be applied for the prevention of transference of the nonelectrolyte which is apt to be transferred together with the ions by electroosmosis in the electrodialysis and for the separation of nonelectrolytes whose degrees of electroosmoses are different from each other. In these operations, the electrolyte must always be contained in the solution.

Separation of a nonelectrolyte from an electrolyte is equivalent to the removal of the electrolyte from a solution of the nonelectrolyte by electrodialysis, said removal being one of the processes for obtaining a favorable result by the use of the ion exchange membrane. In said operation, transference of water accompanied by the removal of the electrolyte during the electrodialysis causes the transport of nonelectrolyte dissolved in said water.

The lower the molecular weight of the nonelectrolyte, the higher the concentration of said nonelectrolyte, and the lower the concentration of the electrolyte, the larger the transport number of the nonelectrolyte becomes, resulting in the occurrence of a large loss of the nonelectrolyte.

On the contrary, in this invention since the electrodialysis is carried out by the use of the micro-porous ion exchange membrane while passing the solution through the pores of said membrane in the direction opposite to that of the ions and water which are transferred by the electric current, the removal of the electrolyte can be effectively achieved without causing any loss of the nonelectrolyte.

Furthermore, by the use of the micro-porous ion exchange membrane, such separation of the strong electrolyte and weak electrolyte such as the separation of chlorine ion and acetic acid ion can be efficiently carried out by preventing the dissociation of acetic acid by maintaining the said solution in a strongly acidic state. Similarly, the separation of alkali ions and ammonia ions can be carried out in a strongly alkaline state.

In the nonelectrolyte also, separation of the solution can be carried out so long as there is a difference between the electroosmoses of the substances composing said solution. Generally, in the compounds belonging to the same group, the higher the molecular weight of said compound, the lower its permeability. This characteristic can be applied for the separation of glucose and xylose. As an interesting application of this invention, the following example may be mentioned. That is to say, the enrichment of heavy water can be attained by electrolysis while passing said water through the micro-porous ion exchange membrane as the ratio of electroosmosis of $H_2O$ to $D_2O$ is $1:1.02-1.07$. In these cases, the operation is due to the action of electroosmosis, so that an electrolyte is indispensable.

The above-mentioned separations are achieved by the difference between the electric migration of the charged particles (ions) or uncharged particles (non-electrolytes) through the ion exchange resin in the membrane, so that the ion exchange resin which gives a large difference between the electric migration of the compositions to be separated is more effective for the purpose of these processes. For example, the known K permeable ion exchange resin is particularly effective for the separation of Na ions and K ions. Generally, when the size of the ions or molecules is different, the higher the degree of crosslinkage of the ion exchange resin, the larger the difference between the electric migration of the compositions of the said solution. For such cases, also, this invention can be applied, but this invention is not limited to such cases and may be applied in the case in which the difference between the electric migration of the composition of the solution to be treated is small.

In this invention, only a part of the ions and/or nonelectrolytes transferred by the electric current is passed back through the micro-porous ion exchange membrane. Accordingly, the flow rate of this refluent solution must be made large when the relative transport number is near to 1 and small when the relative transport number is far from 1, and said flow rate may be in proportion to the electric current. When the composition to be separated has a low relative transport number and is dilute, the flow rate of the refluent solution must be made larger than the transferring amount of the composition which has less mobility, whereby the less movable composition can be obtained.

The novel features which we believe to be characteristics of our invention are set forth with particularity in the appended claims. Our invention itself, however, both as to its principle and manner of operation together with further objects and advantages thereof, may best be understood by reference to the following description taken in connection with the accompanying drawings, in which:

FIG. 1 is a schematic view of an electrolytic cell showing the action of the present invention in carrying out the separation of two kinds of ions having the same sign.

FIG. 2 is a schematic view as in FIG. 1, but corresponds to the case in which the material is to be recovered from the effluent.

FIG. 3 is a schematic view of an electrolytic cell to which this invention is applied and in which the electrolyte is separated from the nonelectrolyte containing said electrolyte.

FIG. 4 is a schematic view of an electrolytic cell to which this invention is applied and in which separation of nonelectrolyte is carried out.

FIG. 5 is a schematic view as in FIG. 4, but corresponds to the case in which the material is to be recovered from the effluent.

FIG. 6 is a schematic view of an electrolytic cell to which this invention is applied and in which electrolysis is carried out by the diaphragm process using two membranes.

FIG. 7 is a schematic view of an electrolytic cell to which this invention is applied and in which electrolysis is carried out by the diaphragm process using one membrane.

FIG. 8 is a schematic view of an electrolytic cell to which this invention is applied and in which the electrolysis is carried out by the mercury process utilizing the membrane of the invention.

FIG. 9 is a schematic view of an electrolytic cell to which this invention is applied and in which acid and base solutions are produced from salt solutions by using a double membrane.

FIG. 10 is a schematic view of an electrolytic cell to which this invention is applied and in which concentration of electrolytic solutions is carried out in a multi-compartment electrodialyzer.

FIG. 11 is a schematic view of an electrolytic cell to which this invention is applied and in which double decomposition $(AX+BY=AY+BX)$ is electrochemically carried out.

FIG. 12 is a schematic view as in FIG. 11, but corresponds to the case in which only one kind of product is recovered.

FIG. 13 is a schematic view of an electrolytic cell to which this invention is applied and in which the separation of two kinds of ions having the same sign, for example, the separation of K ions and Na ions is carried out.

Figure 14:
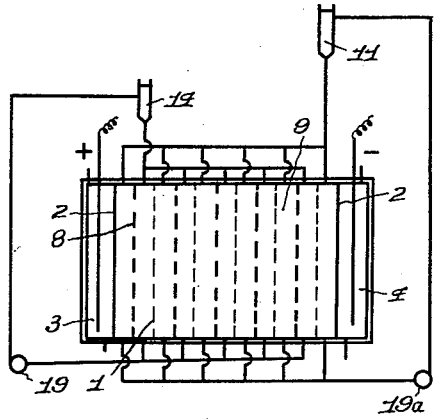
FIG. 14 is a schematic view of an electrolytic cell to which this invention is applied and in which the electrolyte is removed from the nonelectrolytic solution containing said electrolyte.

Referring to FIG. 1, a cathode and an anode are provided at both ends of a multi-compartment electrodialysis cell, in which between said electrodes are alternately arranged the micro-porous cation exchange membranes 1 and anion exchange membranes 2 in such manner that an anion exchange membrane 2 may be positioned at both ends. At both ends of the cell are formed, respectively, a cathode compartment 4 and an anode compartment 3, and between said compartments are formed alternately the starting solution compartment 5 and the concentrate compartment 6. Electrodialysis in the cell is carried out while feeding the mixed solution of NaCl and KCl into the compartment 5 and while also feeding water into the compartment 6.

A part of the water fed into the compartment 6 enters into the compartment 5 through the pores of the micro-porous cation exchange membrane and then is passed out together with the starting solution. The remainder of the water receives K ions transferred from the compartment 5 through the micro-porous ion exchange membrane 1, thereby said water becomes a solution containing the concentrated KCl and is then passed out. When the concentration of KCl in the effluent from the compartment 5 is high, a further micro-porous cation exchange membrane 1a may be added between membranes 1 and 2, as shown in FIG. 2, to form a dilute compartment. In the embodiment in FIG. 2, the starting solution enters into the compartment 7 from the compartment 5 through the pores of the micro-porous cation exchange membrane 1a and is then passed out. At the same time, K ions contained in the compartment 7 are transferred into the compartment 5 through the resinous part of the micro-porous cation exchange membrane. The operation in the compartment 6 is carried out in the same manner as in the embodiment of FIG. 1.

In FIG. 3 is shown another arrangement of the membranes for the separation of electrolyte and nonelectrolyte, in which the starting solution compartment 5 and electrolyte compartment 9 are alternately formed in the cell by arranging alternately the micro-porous anion and cation exchange membranes, and electrodialysis is carried out while feeding the solution of nonectrolyte containing electrolyte into the compartment 5 and while also feeding water into the compartment 9. In this embodiment, the solution of nonelectrolyte containing electrolyte is led out after being demineralized in the compartment 5.

A part of the water fed into the compartment 9 is passed through the pores of the micro-porous anion exchange membranes 8 and cation exchange membranes 1 in FIG. 3, to feed back the nonelectrolyte which permeates into the compartment 9 by the action of electroosmosis, and the remainder of said feed water is removed from the cell, accepting the electrolyte removed from the compartment 5. The above-mentioned flow of refluent solution goes into the compartment 5 from the compartment 9 accompanying the flow of ions, which causes a decrease of current efficiency so that the flow rate of refluent solution must be necessarily maintained relatively small. Accordingly, the use of a micro-porous ion exchange membrane having a low water permeability is preferable. Moreover, since the above-mentioned refluent flow is carried out through the micro-porous anion and cation exchange membranes 8 and 1, the water permeabilities of these membranes must be controlled so that the separation of compositions by said membranes may be balanced.

For the separation of two kinds of nonelectrolytes, an electrodialytic cell as shown in FIG. 3 which is used for the separation of electrolyte and nonelectrolyte can also be used.

That is to say, a mixed solution of two kinds of nonelectrolyte is fed into the starting solution compartment 5 and water is fed into the electrolyte compartment 9, a part of said water enters into the compartment 5 in the direction of the arrow through the micro-porous anion and cation exchange membranes 8 and 1, and the remainder of said water is removed from the cell, accepting one component of the separated nonelectrolyte.

For the separation of solutions having a low concentration and a slight difference between the degrees of electroosmosis such as heavy water and light water, the apparatus shown in FIG. 4 is preferably used, in which the arrangement of the micro-porous ion exchange membranes in the electrolytic cell is the same as in the embodiment of FIG. 3 except for the arrangement of the feed pipes.

The water containing heavy water of about 0.015% is fed into the compartment 5 and a part of said water is passed into the concentrate compartment 6 through the pores of the micro-porous anion and cation exchange membranes. In the course of said flow of the water, the heavy water is concentrated and led out of the concentrate compartment 6 and the remainder containing the reduced amount of heavy water is passed out of the starting solution compartment 5.

In this case, the electrolyte is supplemented in the starting solution compartment 5 or the concentrate compartment 6. The above-mentioned operation is carried out so that the flow rate of refluent solution may be larger than that of the light water which is transferred by the action of the electric current.

When a relatively large amount of the material to be separated from its solution still remains in the solution discharged from the starting solution compartment, an arrangement of the membranes as shown in FIG. 5 is preferably adopted, in which a cathode and an anode are arranged at both ends of the electrolytic cell, anion and cation exchange membranes 2 and 10 are, respectively, provided adjacent to the cathode and anode, and between said membranes 2 and 10 are alternately arranged a set of micro-porous anion exchange membranes 8 and 8a and another set of micro-porous cation exchange membranes 1 and 1a so that said membrane 8 may be made to face the cation exchange membrane 10, said membrane 1 may be made to face the anion exchange membrane 2, and a concentrate compartment 6, a starting solution compartment 5a, a dilute compartment 7, a starting solution compartment 5 and a concentrate compartment 6 may be successively formed. The electrodialysis in said cell is carried out while feeding the starting solution into the compartments 5 and 5a and while feeding the concentrated solution into the concentrate compartment 6. In this case, the starting solution fed into the compartments 5 and 5a enters into the compartment 7 through the micro-porous anion and cation exchange membranes 8a and 1a, while being passed in the direction of the arrow and then is caused to flow out. A part of the solution fed into compartment 6 enters into the starting solution compartment through the micro-porous cation and anion exchange membranes 1 and 8, while being passed in the direction of the arrow. The remainder of the water fed into the compartment 6 is caused to flow out while carrying out the electrolyte and the concentrated nonelectrolyte.

The above embodiment relates only to the several embodiments of arrangement of the ion exchange membranes in an electrodialysis cell. Furthermore, the water to be used for the refluent solution may be substituted by any other solution so long as its composition is suitably selected.

The above-mentioned operations relate to the electrochemical separation of a solution containing an electrolyte by the use of micro-porous ion exchange membranes, but the same principle may be applied for any other electrochemical operation.

In the electrolysis of Glauber's salt for the production of sulphuric acid and caustic soda, each of the H ions produced at the anode side and each of the OH ions produced at the cathode side, is transferred toward the opposite electrode, whereby they neutralize each other. Accordingly, the amounts of the produced sulphuric acid and caustic soda are decreased and current efficiency is relatively low. It is well-known that electrolysis is carried out while making the solution flow into the electrode chamber through the diaphragm to decrease the leakage of H ions and OH ions.

However, such a process is not effective to protect sufficiently said leakage and is very low in its current efficiency, so that said process is very ineffective industrially.

It seems that the above-mentioned defect may be eliminated by the effective utilization of the permselectivity of the ion exchange membrane, but as the selectivity of the ion exchange membrane decreases substantially with increases in the concentration of the solution, the effective utilization of said permselectivity cannot be expected in the case of treatment of a concentrated solution as is used industrially.

However, the leakage of H ions and/or OH ions can be satisfactorily protected by carrying out the electrolysis while passing the solution into the electrode chambers through the micro-porous ion exchange membrane or membranes, whereby the industrially valuable process capable of obtaining acid or alkali having a high concentration from salt solutions having a low concentration has been made possible.

That is to say, when the membranous material consisting mainly of powdery ion exchange resin, having a particle diameter from several $\mu$ to several hundred $\mu$, and having pores between the particles is used, the leakage of H ions and OH ions due to insufficient permselectivity of the ion exchange resin can be suppressed by counterflow of the solution passing through said pores.

The present invention will be explained more concretely in the following figures. Referring to FIG. 6, the electrolytic cell comprises a micro-porous cation exchange membrane 1, a micro-porous anion exchange membrane 8, an anode chamber 3, a cathode chamber 4, and a middle chamber 5. In this cell, when electrolysis is carried out by feeding the solution of Glauber's salt into the chamber 5 and while making said fed solution pass through the membranes 1 and 8, respectively into the cathode chamber 4 and the anode chamber 3, sulphuric acid solution is produced in the anode chamber 3 and caustic soda solution is produced in the cathode chamber 4.

In the above embodiment, when a micro-porous ion exchange membrane having a low water permeability is used and the solution to be treated is fed into the electrode chambers by the high water head, suppression of the leakage of H ions and OH ions can be effected, but, as will be explained in the latter embodiments, a relatively high efficiency of electric current can be obtained even when a micro-porous ion exchange membrane having a relatively high water permeability is used.

By use of a diluted Glauber's salt, with a micro-porous ion exchange membrane having a low water permeability or by use of a thick micro-porous ion exchange membrane, concentrated sulphuric acid and caustic soda can be obtained from dilute salt solution by transference of ions through the ion exchange resin of said membrane. In this embodiment, the salt solution removed of its ions is caused to flow out of the middle chamber as shown in Example 9.

The process comprising the step of electrolyzing a dilute solution of NaCl, such as the one prepared by the purification of sea water, to produce caustic soda and chlorine is also industrially important. In this process, it is necessary to add common salt to the anode chamber so as to concentrate the solution of NaCl to decrease the solubility of chlorine, because when the concentration of the solution of NaCl in the anode chamber is low, chlorine will be dissolved in said solution. In this case, if the solution of NaCl is made to flow from the starting liquid chamber into the anode chamber through the micro-porous anion exchange membrane partitioning the middle chamber and anode chamber, very efficient electrolysis can be attained.

In the above embodiment, it is disadvantageous for an excessively large amount of the solution to flow out from the anode chamber. This disadvantage can be eliminated by use of a micro-porous ion exchange membrane having a low water permeability and by feeding the solution at a low rate of flow into the anode chamber, whereby the leakage of NaCl can be suppressed. When common salt is used as the agent minimizing the dissolution of chlorine, the process comprising the steps of subjecting the solution drained from the anode chamber to a dechlorination chamber to concentrate said solution and causing the crystallization of common salt, and adding again said product into the anode chamber or recycling the purified and concentrated solution of salt into the anode chamber, is adopted. This process is described in Example 10.

In the embodiment of FIG. 7, the concentrated solution of common salt fed into the anode chamber 3 enters into the cathode chamber 4 through the micro-porous cation exchange membrane 1, and is then obtained therefrom as a solution of caustic soda.

This process is similar to the usual process for the electrolysis of common salt, namely the diaphragm process, except that the micro-porous cation exchange membrane is used in the former in place of a diaphragm. By the action of said micro-porous cation exchange membrane, Na ions migrate into the cathode chamber, leakage of OH ions produced in the cathode chamber into the anode chamber is suppressed, and the solution of caustic soda can be produced with a high current efficiency.

In the embodiment of FIG. 8, the dilute solution of common salt is introduced into the cathode chamber 4 having the mercury cathode 12 and then is passed into the anode chamber 3 through the micro-porous anion exchange membrane 8. For the purpose of decreasing the loss of the chlorine produced in the anode chamber, said loss being caused by the dissolution of chlorine into the dilute solution of common salt, the addition of crystalline common salt into the anode chamber or recycling of the concentrated solution of common salt may be adopted, as described already. In this embodiment, the transfer of Cl ions into the anode chamber as well as the suppression of the diffusion of common salt and chlorine from the anode chamber into the cathode chamber can be attained by making the electrolyte flow into the anode chamber through the micro-porous anion exchange membrane.

As will be understood from the above embodiments, according to the process of the present invention, electrolysis is carried out while suppressing electric or diffusional migration of the component produced or added in the cathode chamber or anode chamber into the adjacent chamber and while transporting anions and cations, respectively, into the cathode chamber and anode chamber. Accordingly, such various industrial effects as the improvement of the efficiency of the electric current, the production of the concentrated solution and the possibility of using a dilute solution as the starting solution will be obtained.

Furthermore, the process in which acid and base solutions are produced from a salt solution by the use of an acid-base double membrane (U.S. Pat No. 2,829,095) can be improved by the application of the micro-porous ion exchange membranes.

In the process of obtaining acid and base solutions from a salt solution by electrolyzing the solution by the use of a double membrane composed of cation and anion exchange membranes, dissociation of water into H ions and OH ions is carried out by conducting electric current from the anion exchange membrane side to the cation exchange membrane side of said double membrane. However, the current efficiency in this reaction is effected to a substantial extent by the concentrations of acid and base solutions. For example, the efficiency of the double membrane is greatly reduced with an increase in the concentration of the solution, said fact being proved by the following data.

| Efficiency of electric current: | Concentration of HCl or NaOH solution |
|---|---|
| 93% | 0.2 N |
| 83% | 0.5 N |
| 67% | 1 N |

The cation barrier membrane forming the partition between the acid compartment and the salt compartment acts to feed anions into acid chamber and to suppress the leakage of H ions from the acid compartment but said actions are greatly reduced with an increase in the concentration of the acid, said fact being due to the large mobility of H ions. In the same manner, the leakage of OH ions cross the anion barrier membrane forming the partition between the salt compartment and base compartment is increased with an increase in the concentration of the base. Owing to the above-mentioned two reasons, production of the concentrated acid or base solution cannot be effectively attained by a mere combination of the double membrane with the cation barrier membrane and the anion barrier membrane.

According to the process of the present invention, the above-mentioned disadvantages can be eliminated and any concentrated solution can be obtained with a high current efficiency. Decrease of the current efficiency of the double membrane can be minimized by dividing the acid compartment or the base compartment or both acid and base compartments with the micro-porous cation or anion exchange membranes, and by passing water from the compartment in contact with the double membrane into the concentrated acid compartment or concentrated base compartment through the said micro-porous cation or anion exchange membrane so as to maintain the acid or base solution in the compartment in contact with the double membrane at a low concentration.

Even an inert (non-permoselective) diaphragm is effective as a partition dividing the acid compartment or base compartment, but the most favorable result can be obtained by providing a micro-porous cation exchange membrane in the acid compartment and by providing a micro-porous anion exchange membrane in the base compartment, whereby the concentrated acid or base can be effectively obtained.

Action of the micro-porous cation exchange membrane in the acid compartment will be explained as follows, in connection with hydrochloric acid. The amount of Cl ions entering into the diluted acid compartment from the concentrated acid compartment by the action of diffusion and electric current is small due to the anion-passage-resistant property of micro-porous cation exchange membrane. Said small amount of Cl ions is further reduced by the reverse stream of the water through the micro-porous cation exchange membrane. This action can be obtained somewhat by the use of an inert diaphragm, but when the micro-porous cation exchange membrane is used, the concentration of acid in the diluted acid compartment can be effectively decreased. Moreover, a high electroconductivity of the micro-porous ion exchange membrane is an industrially favorable characteristic. The case of the micro-porous anion exchange membrane in the base compartment is similar.

When the micro-porous anion exchange membrane is used as the cation barrier membrane forming the partition between the salt compartment and the acid compartment, and the salt solution is passed into the acid compartment from the salt compartment through said membrane, the leakage of H ions by the action of diffusion and electric current can be suppressed by feeding back H ions into the acid compartment. Similarly, the leakage of OH ions can be suppressed by the use of a micro-porous cation exchange membrane as the anion barrier membrane forming the partition between the salt compartment and the base compartment.

That is to say, when electrolysis is carried out while passing the salt solution into the acid compartment or the base compartment from the salt compartment through the micro-porous anion or cation exchange membrane, the production of acid or base can be attained with an improved current efficiency. Prevention of the migration of H ions or OH ions is difficult, because the mobility of OH ions or H ions is relatively higher than that of Cl ions. Accordingly, a thick membrane having small voids and having a low water permeability is particularly suitable for the above case.

Each of the above-mentioned processes is effective even when it is used individually, but if they are combined, a particularly favorable result will be obtained. For example, if said processes are used for the production of any concentrated acid or base solution from the diluted salt solution, an industrially large advantage will be obtained.

The action of the process of the present invention will be explained in connection with FIG. 9, in which the multi-compartment electrolytic cell consists of many units, each consisting of the successively arranged micro-porous cation exchange membrane 1, the micro-porous anion exchange membrane 8, the micro-porous cation exchange membrane 1a, the micro-porous anion exchange membrane 8a, the anion exchange membrane 2 of the double membrane, and the cation exchange membrane 10 of the double membrane from an anode. The acid compartment is formed between the membranes 10 and 8, and the diluted acid compartment 13a and the concentrated acid compartment 13 are partitioned by the micro-porous cation exchange membrane 1, the starting solution compartment (salt compartment) being formed between the membranes 8 and 1a, the base compartment being formed between the membranes 1a and 2, and the diluted base compartment 15a and concentrated base compartment 15 being partitioned by the membrane 8a.

The salt solution enters into the starting solution compartment 5, and then a part thereof enters into the concentrated acid compartment 13 through the membrane 8 and another part enters into the concentrated base compartment 15 through the membrane 1a. As the ions of the salt solution in the compartment 5 are removed by the action of the ion exchange membranes 8 and 1a during the electrolysis, the solution becomes diluted and may be removed. Water is fed into the diluted acid compartment 13a and enters into the concentrated acid compartment 13 through the micro-porous cation exchange membrane 1 and then is passed therefrom as the concentrated acid solution. The water fed into the diluted base compartment 15a is passed into the concentrated base compartment 15 through the micro-porous anion exchange membrane 8a and then is removed as the concentrated base solution.

When electrolysis is carried out while passing the diluted solution into the concentrated compartment 13 or 15 from the dilute compartment 13a or 15a through the micro-porous cation exchange membrane 1 or the micro-porous anion exchange membrane 8a, the concentration of the diluted acid compartment or the base compartment is maintained at a low value, whereby the efficiency of the double membrane may be improved.

By passing the salt solution into the concentrated base compartment 15 or the concentrated acid compartment 13 from the salt compartment through the micro-porous cation exchange membrane 1a or the micro-porous anion exchange membrane 8, the leakage of H ions from the acid compartment 13 and leakage of OH ions from the base compartment 15 can be prevented.

The application of the process of the present invention will be explained in the case of the concentration of an electrolyte solution with a multi-compartment cell, in which the micro-porous anion and cation exchange membranes are alternately arranged.

It is well-known to concentrate any electrolyte solution by electrodialysis in a multi-compartment cell in which cation and anion exchange membranes are arranged alternately. However, in the above process, the current efficiency is decreased with an increase in the concentration of the concentrate by electrical or diffusional migration of ions from the concentrated side to the diluted side caused by imperfections in the membrane's permselectivity.

However, the process of the present invention consists in using the micro-porous ion exchange membrane and in carrying out electrolysis while causing the electrolyte solution to flow from the dilute compartment to the concentrate compartment by the pressure difference between them, whereby the leakage of ions by diffusional or electrical migration caused by insufficient permselectivity of the membrane from the concentrated side to the diluted side are fed back, thus the current efficiency for the concentration of the electrolyte is improved. To obtain the concentrated solution with high current efficiency, it is preferable to use thick membranes with low water permeability and to make the refluent solutions flow at a low flow rate.

In the embodiment of FIG. 10, the cathode compartment 4 and the anode compartment 3 are provided at both ends of the electrolytic cell, and a plurality of micro-porous anion exchange membranes 8 and cation exchange membranes 1 are alternately arranged between said compartments 4 and 3 to form an electrolytic compartment between a pair of adjacent membranes. In said electrolytic cell, when an electric current is conducted between both electrodes while feeding the electrolyte solution into the alternate cell compartment 7 (denoted as the dilute compartment in the following) through the pipe 16, removing a large part of said fed solution through the pipe 17 and making a part of said solution flow into the adjacent alternate cell compartment 6 (denoted as the concentrate compartment in the following) through the ion exchange membranes 1 and 8 and then removing it through the pipe 18, the cations and anions in the electrolyte in the dilute compartment 7 are caused to pass into the concentrated compartment 6 through, respectively, the cation exchange membrane and the anion exchange membrane. Accordingly, the solution flowing from the pipe 18 becomes the concentrated electrolyte solution.

In the above case, micro-porous ion exchange membranes having small voidage and comparatively low water permeability, namely 1–20% and 10–200 cc./dm.$^2$m. hr., respectively, are used.

In this operation, water or dilute solution must not be principally fed into the concentrate compartment 6 from an external source. But, sometimes, the dilute medium is recycled to the dilute compartment 7 and/or the concentrate is recycled to the concentrate compartment 6 in order to improve the stirring of the solution in the compartment. In embodying this invention, it may be possible to use the water impermeable membrane as either one of the anion and cation exchange membranes.

The most effective application of the present invention consists in the concentration of a solution available plentifully such as sea water.

It has been proposed in Japanese patent publication No. 2822/1956 to carry out electrochemically the double decomposition of an electrolyte solution composed of AX and BY by the use of a multi-compartment electrolytic cell to obtain AY and BX. In this process also, the permselectivity of the membrane decreases with increase in the concentration of the solutions to be treated and therefore the current efficiency decreases.

In this process, if the micro-porous ion membrane is used and electrolysis is carried out while causing the electrolyte to flow through said membrane so as to push back the leakage ions, the double decomposition can be effectively carried out. One of the embodiments of the above double decomposition is explained as follows in connection with FIG. 11. In FIG. 11, the electrolytic cell is formed by arranging a plurality of units, each unit comprising successively arranged an anion barrier membrane 1, a cation barrier membrane 2, an anion barrier membrane 10 and a cation barrier membrane 2a from the anode. The anode compartment 3 and cathode compartment 4 are placed at both ends of the cell. Electrolysis is carried out while feeding the solution of NaCl into the compartment 5 and also feeding the solution of Ca(OH)$_2$ into the compartment 5a, whereby the solutions of NaOH and CaCl$_2$ are respectively, obtained in the compartments 9 and 9a. In this process, leakage of OH ions from the compartment 9 to the compartment 5 must be prevented by the barrier membrane 1.

However, since the mobility of OH ions is greater than that of the other ions, said leakage of OH ions cannot be effectively prevented in the case of a concentrated alkali solution even when a membrane having a large selective permeability such as a cation exchange membrane is used as the barrier membrane 1.

However, when a micro-porous cation exchange membrane is used as the barrier membrane 1 and the electrolysis is carried out so that a part of the electrolyte solution in the compartment 5 may be passed into the compartment 9 through said membrane, leakage of OH ions can be effectively prevented and the solution of NaOH can be obtained with a high current efficiency.

As the analogous case to the above-mentioned process, Japanese patent publication No. 3960/1957 describes a cell formed by arranging a plurality of units, each unit comprising successively arranged a membrane 10 (with or without permselectivity), a cation exchange membrane 1, and an anion exchange membrane 2 from the anode, as shown in FIG. 12.

In this embodiment, the solution of NaOH can be obtained in the base compartment 15 by carrying out electrolysis while feeding the solution of NaCl and the solution of $Ca(OH)_2$ into the compartment 5 and compartment 5a respectively. In the above process, however, the leakage of OH ions from the base compartment 15 into the compartment 5 cannot be effectively prevented by the cation exchange membrane 1. However, said leakage of OH ions can be effectively prevented and the current efficiency of the electrolysis can be improved by the use of the micro-porous cation exchange membrane as the barrier membrane 1, while passing the electrolyte from the compartment 5 to the base compartment 15 through the said micro-porous cation exchange membrane.

In said embodiment, the solution of NaCl may be substituted by a solution of alkali salt and the solution of $Ca(OH)_2$ may be substituted by a solution of any hydroxide, carbonate or bicarbonate, excepting said alkali, to obtain the solution of hydroxide, carbonate or bicarbonate of alkali respectively.

On the whole, the characteristic point of the present invention for the electrochemical reaction consists in using the micro-porous exchange membrane as the barrier membrane while making the electrolyte flow in the direction opposite to that of ion leakage by hydraulic pressure to minimize said leakage caused by the electrical and diffusional migration of ions.

The above-mentioned embodiments relate to various electrochemical applications of the present invention, in which the microporous ion exchange membranes are used. It is necessary that the said membranes have uniformly distributed fine pores to make the electrolyte flow uniformly through said membrane. It is preferable to use a micro-porous exchange membrane having comparatively small voidage with 40% at most and having a suitable water permeability ranging from 10 to 10,000 cc./dm.$^2$ m. hr.

The process for the preparation of the micro-porous exchange membrane effectively used in accordance with the present invention will be explained as follows. The porous ion exchange membrane used in this invention is, moreover, not limited thereto.

As the main constituent are used the powders or fibers of ion exchange resin, the diameter thereof being below 300μ.

As the pore forming agent are used the fine powder of any substance capable of being dissolved with water or a solvent such as common salt, Glauber's salt, calcium carbonate, starch and the like. As the binding agent is used a nonelectroconductive resin such as polyethylene or polyvinylchloride or various ion exchange materials.

A sheet is prepared from a mixture of said ion exchange resin, porous gap forming agent and binding agent and then this sheet is dipped in a suitable solvent to dissolve out the pore forming material, whereby an excellent micro-porous ion exchange membrane having uniform fine pores and capable of passing water or solution therethrough, can be obtained.

As the ion exchange resin for the preparation of the membrane by this process there may be used any kind of cation exchange resin and anion exchange resin, for example polystyrene sulphonic acid resin, polycarbonic acid resin, phenol sulphonic acid-formalin resin, polyamine resin containing 1–4 amine radicals, ion exchange resin derived from polyvinylalcohol (ion exchange fiber such as that described in Japanese patent publication No. 8469/1957, ion exchange resin with various degrees of crosslinkage, cation exchange resin having selective permeability for potassium, and other ion exchange resins.

The size of the ion exchange resin or fibers is selected in accordance with its use. For example, the material composed of particles, each having a large diameter, is preferable to prepare a membrane having a high water permeability. Preparation of a membrane consisting of fine particles is easier than preparation of a membrane consisting of large particles. However, the diameter of each of the particles is selected below 300μ and more particularly, a particle size between 100 and 400 mesh is most preferable.

As the pore forming agent are normally used the particles of a salt having high solubility and capable of being easily dissolved with water such as common salt, Glauber's salt and the like, but there is the case in which precipitated calcium carbonate or starch capable of being easily obtained as a uniform fine powder are preferable. However, in certain kinds of pigment such as zinc white, said particles will be imbedded into the binding agent due to adhesiveness to said binding agent, thus causing difficulty in the pores. The favorable diameter of the fine pore forming agent is ordinarily equal to or a fraction of that of the ion exchange resins.

It is preferable to use a nonelectroconductive resin such as the easily obtainable polyethylene or polyvinyl chloride as the binding agent which binds the ion exchange resin particles or fibers to form a membranous sheet. This material can be treated to prepare a membrane by a process for the preparation of an ion exchange membrane such as proposed by U.S. Patent No. 2,681,319.

Moreover, ion exchange material may be used as the binding agent. In this case, a thin layer is formed from a mixture of a viscous liquid such as the condensate of ethyleneimine-epichlorhydrin or the intermediate polymer of styrene sulphonic acid ester, the powder of ion exchange resin and the pore forming agent and then hardened to form a membrane. The membrane may be prepared by the process which comprises forming a sheet by treating the mixture of ion exchange resin and fine pore forming agent with polyvinylalcohol, hardening said sheet with formalin, and treating said hardened layer with an agent capable of converting polyvinylalcohol to ion exchange resin such as phosphorus oxychloride.

The after-treatment for the removal of pore forming agent is carried out with an appropriate solvent, for example, common salt is treated with water and calcium carbonate is treated with hydrochloric acid.

Since the membrane prepared by the above-described process has uniform fine pores therein, electrolytic barrier membranes having desirable permeability such as the capability of passing a solution in an amount between 10 cc. and 10 l. per 1 dm.$^2$/hour at a pressure of 1 m. of water head can be obtained by suitable selection of the diameter of the ion exchange powder or fiber and by suitable adjustment of the size of the fine pore forming agent or by varying the composition of the membrane.

The micro-porous ion exchange membrane is particularly excellent as the electrolytic barrier membrane, said excellency being due to the fact that the electrolysis is carried out while passing the solution through the pores of the barrier membrane.

Since the main action of the micro-porous ion exchange membrane consists in the action of the ion exchange resinous portion, it is preferable to make the amount of the binding agent nonelectroconductive resin, as small as possible so long as strength of the membrane is not weakened. Moreover, in the use of said membrane in electrolysis, it is preferable to make the voidage of the membrane small in order to increase the electric current conduction through the ion exchange resin, and particularly, if necessary, said voidage may be selected so as to be of the order of below 40% or sometimes 10%.

*Example 1*

Sheets were formed by kneading a mixture of polyethylene, powdery ion exchange resin and powdery common salt by means of a calender heated to 120° C.

Said sheets were taken out of the calender and then washed with hot water, whereby the common salt was removed and microporous ion exchange membranes were obtained. The particle size, composition and properties of said membranes are indicated in the following table, in which Amberlite was used as the ion exchange resin, and the permeability is represented by cc. number of the aqueous solution of NaCl (0.5 N) flowing per hour per dm.² at a pressure of 1 m. of water head.

| Number of membrane | Kind of resin | Amount of resin, parts | Amount of common salt, parts | Amount of polyethylene, parts | Thickness of membrane, mm. | Permeability, cc./dm.² m. hr. |
|---|---|---|---|---|---|---|
| A-3 | IRA-400 | 10 | 4.5 | 4 | 0.7 | 6 |
| A-4 | IRA-400 | 10 | 4.5 | 4 | 0.7 | 100 |
| A-5 | IRA-400 | 10 | 4.3 | 4 | 0.7 | 110 |
| A-6 | IRA-400 | 10 | 12.5 | 4 | 0.6 | 6,800 |
| A-7 | IRA-400 | 10 | 12.5 | 5 | 2.0 | 900 |
| A-8 | IRA-400 | 10 | 5.0 | 4 | 1.2 | 150 |
| A-9 | IRA-400 | 10 | 10.0 | 4 | 2.0 | 450 |
| A-11 | IRA-400 | 7 | 0 | 2 | 0.6 | ---------- |
| C-3 | IR-120 | 12 | 5.5 | 5 | 0.7 | 142 |
| C-4 | IR-120 | 10 | 15.0 | 6 | 0.7 | 1,540 |
| C-5 | IR-120 | 10 | 4.0 | 4 | 0.7 | 75 |
| C-6 | IR-120 | 12 | 17.0 | 5 | 0.6 | 5,200 |
| C-7 | IR-120 | 12 | 12.5 | 5 | 1.9 | 950 |
| C-8 | IR-120 | 12 | 9.0 | 5 | 2.0 | 330 |
| C-10 | IR-120 | 3 | 0.0 | 1 | 0.6 | ---------- |

In the above table, IRA-400 is Amberlite IRA-400, and IR-120 is Amberlite IR-120.

In the membranes of the above table, the particle size of resin and common salt were selected to pass 300 mesh.

The specific resistances of the above micro-porous anion exchange membranes and micro-porous cation exchange membranes were, respectively, 60–150Ω/cm. and 60–130Ω/cm. with the membrane dipped in an aqueous solution (0.5 N NaCl) at 25° C.

The membranes of this example were used in the following examples.

*Example 2*

The test pieces were prepared as a micro-porous membrane by the same method as in Example 1, but Glauber's salt powder and polyvinyl chloride were used, respectively, as the fine pore forming agent and as the binding agent. Moreover, the membrane was prepared by the use of a calender heated to 40° C. using a small amount of cyclohexanone as the solvent for polyvinylchloride.

B. Mixture prepared by mixing 13 parts of calcium carbonate powder passing 300 mesh with 2 parts of a solution of 10% polyvinylalcohol and by drying said mixture.

C. Viscous material prepared by mixing 1.2 parts of polyethyleneimine, 3 parts of epichlorhydrin, 1 part of Epon 828 and 3 parts of methanol and by stirring said mixture for about 30 minutes at 30° C.

The above-mentioned products (A), (B) and (C) were kneaded, held between two sheets of cellophane to form a thin sheet, and then hardened for 48 hours at a temperature of 40° C. Said hardened membrane was stripped of cellophane and then treated with diluted caustic soda and then with diluted hydrochloric acid to remove the calcium carbonate. The thickness of the prepared membrane was about 1.1 mm., the permeability thereof was 2900 cc. under the same conditions as in Example 2, and the specific resistance thereof was 270Ω/cm.

*Example 4*

The apparatus shown in FIG. 13 was used, in which the electrolytic cell was composed of five units, each unit comprising a micro-porous cation exchange membrane 1, an anion exchange membrane 2, a starting solution compartment 5 and a concentrate compartment 6. The anode compartment 3 and the cathode compartment 4 were placed at both ends of the cell. The membranes (C-4) and (A-11) were used respectively as the micro-porous cation exchange membrane 1 and the anion exchange membrane 2, and the surface area of the membrane was 8 cm. x 12 cm. A head tank 11 containing the concentrate was arranged so that the surface of the solution in said tank may be positioned at a level higher by 8 cm. than that of the head tank 14 containing the starting solution. In this example, the solution containing NaCl (0.5 N) and KCl (0.01 N) was used as the starting solution and water was used as the refluent solution. Electrolysis was carried out by an electric current of 2 a. while recycling the solution at the rate of about 1 l. per minute by the pumps 19 and 19a. As the electrode solutions were used a 0.5 N-solution of NaCl. During electrolysis, the above-mentioned starting solution of 2 l. per hour was passed into the compartment 5 through the inlet 20 and the excess of said solutions was flowed out through the outlet 21 while maintaining the surface of the head

| Ion exchange resin | | Glauber's salt | | Polyvinyl chloride, amount (parts) | Thickness, mm. | Permeability, cc./dm.² m. hr. | Specific resistance, Ω/cm. |
|---|---|---|---|---|---|---|---|
| Kind of resin | Particle size (mesh) | Amount (parts) | Particle size (mesh) | Amount (parts) | | | | |
| IRA-400 | 200-300 | 10.5 | 100-200 | 15.5 | 4.5 | 0.75 | 2,000 | 415 |
| IR-120 | 200-300 | 15.0 | 100-200 | 17.5 | 5.1 | 0.8 | 3,150 | 170 |

*Example 3*

A. 10 parts of powdery Amberlite IRA-400, having a particle size passing 300 mesh.

tank 14 at a constant level. The concentrated refluent solution of KCl was taken out of the concentrate compartment 6 through the outlet 21a at a rate of 60 cc. per hour, and water was introduced so as to maintain the surface of the solution in the head tank 11 at a constant level. In this example, the concentration of KCl in the refluent solution became higher than that of the starting solution with progression of the electrodialysis. In the stationary state, the concentrations of NaCl and KCl reached, respectively, 0.44 N and 0.041 N. An electrolytic voltage of 12.5 volts was employed.

Example 5

In this example, the apparatus shown in FIG. 14 was used, in which the membranes (C–3), (A–5) and (A–11) were, respectively, used as the micro-porous cation exchange membrane 1, the micro-porous anion exchange membrane 8 and the anion exchange membrane 2. The surface area of each of said membranes was 8 cm. x 12 cm. and the electrolytic cell was composed of five units. The arrangement of the electrolytic compartment was the same as that in FIG. 3. The surface of the solution in the head tank 11 for the refluent solution was positioned at a level higher by 10 cm. than that of the head tank 14. 1 l. of the solution containing 10.2% of glycerine and 1.2% of NaCl and 1 l. of the solution containing 0.7% of NaCl were, respectively, used as the starting solution and effluent solution. The electrolysis was carried out by an electric current of 2 a. while recycling said solution at a rate of 1 l. per minute by means of the pumps 19 and 19a. The initial electrolytic voltage was 14.2 volts. As the electrode solutions was used a N-solution of NaCl. Water was introduced into the head tank 11 in order to maintain the difference of surface levels in the tanks 11 and 14 at a constant value. After operation for 45 minutes, the voltage increased to 75 volts. In this state, the amount of starting solution became 1065 cc., NaCl decreased to 0.07% and glycerine in the effluent solution became 0.06%.

Example 6

In this example, the membranes (C–3) and (A–5) were, respectively, used as the micro-porous cation exchange membrane 1 and the micro-porous anion exchange membrane 8, and the apparatus shown in FIG. 14 was used. Said apparatus was composed of five units and carbon electrodes, each of said units comprising a membrane having a surface area of 8 cm. x 12 cm. The surface level in the head tank 11 containing the refluent solution was selected so as to be higher by 10 cm. than the surface level in the head tank containing the starting solution. The starting sugar solution and the refluent solution were, respectively, composed of a solution containing 9.38% of glucose and 1.0% of hydrochloric acid, and a solution containing 0.2% of hydrochloric acid, each of said solutions being selected so as to be 1 l. As the solutions in the electrode compartment were used 2.0% hydrochloric acid. The electrodialysis was carried out by conducting 2 a. of electric current while recycling the starting sugar solution and refluent solution at a rate of 1 l. per minute. The initial electric voltage was 5.3 volts, but said voltage increased gradually with the progression of the electrodialysis. The decrease in the amount of the refluent solution due to the progression of the electrodialysis was compensated by introducing water so as to keep the pressure difference between the starting sugar solution and the refluent solution at a constant value. The amount of the hydrochloric acid in the starting solution decreased to 0.09% after two hours and 0.02% after two hours and fifteen minutes, the amount of said solution being 1200 cc. The amount of the refluent solution was 1180 cc. and contained 0.97% of hydrochloric acid and 0.03% of glucose.

The above example relates to a batch system, but it may be embodied as a continuous desalting system by simple modification thereof.

Example 7

Figure 15:
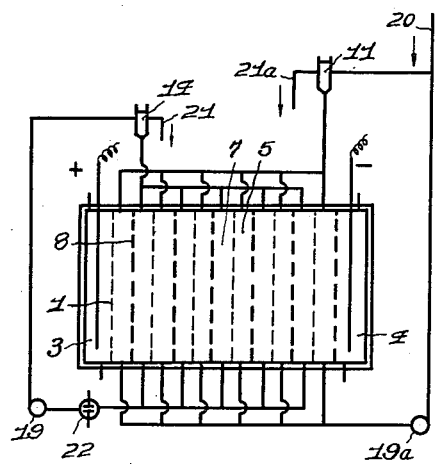
FIG. 15 is a schematic view of an electrolytic cell to which this invention is applied and in which separation of a nonelectrolyte, for example, the enrichment of heavy water is carried out.

In this example, the apparatus shown in FIG. 15 was used, in which the membranes (C–5) and (A–3) were, respectively, used as the micro-porous cation and anion exchange membranes 1 and 8, the surface area of each of said membranes being 8 cm. x 12 cm. and said apparatus being composed of ten units. The arrangement of the starting solution compartment 5 and dilute compartment 7 were used is the same as shown in FIG. 4. The head tank 14 containing heavy water was arranged at a position lower than that of the head tank 11 containing ordinary water. An aqueous solution of NaCl (0.5 N) was used as the starting solution and introduced from the inlet pipe 20 at a rate of 2 l. per hour, and a part thereof was flowed out of the outlet pipe 21a so as to keep the water head in the head tank 11 at a constant level. A conductivity cell 22 for measuring the electroconductivity was put in the heavy water side and NaCl was supplemented so as to keep the concentration of NaCl in the heavy water at 0.5 N. The pressure difference between the head tanks was adjusted so that the solution could be led out of the outlet pipe 21 at a rate of 14 cc. per hour without varying the water level in the head 14. The electrolysis was carried out by passing 2 a. of electric current between anode and cathode while recycling the solutions at a rate of about 1 l. per minute by means of the pumps 19 and 19a. With the progression of the electrolysis, the concentration of heavy water in said water side increased gradually, and said concentration become 0.02% upon reaching the stationary state. In this state, this voltage was 9.2 volts.

Example 8

In the electrolytic cell shown in FIG. 6, the membranes (C–6) and (A–6) were, respectively, used as the micro-porous ion exchange membranes 1 and 8, the surface area of each of said membranes being 12 cm. x 8 cm. A 2 N solution of $Na_2SO_4$ was introduced into the middle chamber 5 from the feed inlet pipe 16 and the pipe 17 was closed so as to check the discharge of the solution. The solution entered into the cathode chamber 4 and the anode chamber 3, respectively, through the membranes 1 and 8. The effluent from the cathode chamber 4 was separated by the separator 23 from the hydrogen and then removed through discharge pipe 21 at a rate of 160 cc. per hour and said separated hydrogen was removed through the exhaust pipe 24. The effluent from the anode chamber 3 was separated by the separator 23a from oxygen and then removed through the discharge pipe 21a at a rate of 194 cc. per hour and said separated oxygen was removed through the exhaust pipe 24a. The cathode was made of iron and the anode was made of lead alloys containing 1% of silver. The electrolysis was carried out by a direct current of 5 a. and an electric voltage of 4.7 v. The mixed solution containing 1.04 N NaOH and 1.46 N $Na_2SO_4$ and the mixed solution containing 0.87 N $H_2SO_4$ and 1.66 N $Na_2SO_4$ were, respectively, obtained from the discharge pipes 21 and 21a.

Example 9

In this example, an electrolytic cell as shown in FIG. 6 was used and the membranes (C–7) and (A–7) were, respectively, used as the micro-porous ion exchange membranes 1 and 8, the surface area of each of said membranes being the same as that in Example 6.

The solution in the cathode chamber was flowed out of the discharge pipe 21 at a rate of 102 cc. per hour and the liquid in the anode chamber was flowed out through the discharge 21a at a rate of 110 cc. per hour while introducing a 0.5 N solution of $Na_2SO_4$ into the middle chamber 5 from the pipe 16 and flowing out said solution through the pipe 17 at a rate of 650 cc. per hour.

When electrolysis was carried out by an electric current of 5 a. and an electric voltage of 5.1 v., the mixed solution containing 1.66 N NaOH and 0.09 N $Na_2SO_4$ and the mixed solution containing 1.53 N $H_2SO_4$ and 0.18 N $Na_2SO_4$ were, respectively, obtained from the discharge pipes 21 and 21a.

*Example 10*

In this example, the same electrolytic cell as in Example 9 was used, and the membranes (C-7) and (A-8) were, respectively, used as the micro-porous cation exchange membrane 1 and the mico-porous anion exchange membrane 8. The cathode and anode were, respectively, made of iron and graphite.

The solution in the cathode chamber was taken out of the discharge pipe 21 at a rate of 108 cc. per hour and a 5.1 N solution of NaCl was introduced into the anode chamber at a rate of 135 cc. per hour and was removed through the discharge pipe 21a at a rate of 160 cc. per hour, while introducing a 0.5 N solution of NaCl into the pipe 16 and removing said solution through the pipe 17 at a rate of 630 cc. per hour.

The electrolysis was carried out by a direct current of 5 a. and an electric voltage of 4.6 v., thereby the mixed solution containing 1.59 N NaOH and 0.08 N NaCl was obtained from the discharge pipe 21 and 6.2 gr. of chlorine was obtained per hour from the exhaust pipe 24a.

Since the NaCl solution drained out of the anode chamber contains 4.1 N NaCl, said solution is dechlorinated and then recycled into the anode chamber after concentration.

*Example 11*

In this example, the electrolytic cell shown in FIG. 7 was used, in which the membrane (C-7) was used as the micro-porous cation exchange membrane 1 having a surface area of 12 cm. x 8 cm. The cathode and anode were made of the same material as in Example 10.

A 5.1 N solution of NaCl was fed from the pipe 16 into the anode chamber 3 and then was flowed into the cathode chamber 4 through the micro-porous cation exchange membrane 1. The effluent from the cathode chamber was separated from the produced hydrogen by a separator 23 and then flowed out through the discharge pipe 21. Said hydrogen was exhausted through the exhaust pipe 24 and the chlorine produced in the anode chamber was removed through the exhaust pipe 24a.

The electrolysis was carried out by a direct current of 5 a. and an electric voltage of 4.1 v., and a mixed solution containing 3.32 N NaOH and 1.91 N NaCl was obtained at a rate of 53 cc. per hour.

*Example 12*

In this example, the cell of FIG. 8 was used. The membrane (A-8) was used as the micro-porous anion exchange membrane 8 having a surface area of 12 cm. x 8 cm. The anode was made of graphite and mercury was used as the cathode 12, and fed through the inlet pipe 25 and removed through the outlet pipe 25a.

A 0.5 N solution of NaCl was fed into the pipe 16 and removed through the discharge pipe 21 at a rate of 1300 cc. per hour. A 5.1 N solution of NaCl was introduced through the inlet pipe 20 of the anode chamber at a rate of 280 cc. per hour and then removed through the discharge pipe 21a at a rate of 330 cc. per hour.

Electrolysis was carried out by conducting direct current of 10 a. at an electric voltage of 6.7 v. between the anode and cathode, thereby 6.3 kg. amalgam containing 0.13% Na, was obtained from the mercury discharge pipe 25a per hour, and 6.4 g. chlorine was obtained through the exhaust pipe 24a per hour and at 4.1 N solution of NaCl was removed through the discharge pipe 21a. The amalgam can be denuded to aqueous caustic soda by the conventional method.

*Example 13*

In this example, the electrolytic cell shown in FIG. 8 was used. The membrane (A-7) was used as the microporous anion exchange membrane 8 having a surface area of 12 cm. x 8 cm. The anode was made of lead containing 1% silver.

A 0.5 N solution of $Na_2SO_4$ was fed into the cathode chamber 4 through the pipe 16 at a rate of 700 cc. per hour and then removed through the discharge pipe 21. In this case the feeding pipe 20 is closed. Electrolysis was carried out by conducting a direct current of 5 a. at an electric voltage of 5.1 v. between anode and cathode, whereby amalgam containing 0.11% Na was obtained from the discharge pipe 25a at a rate of 3.55 kg. per hour and the mixed solution containing 1.44 N $H_2SO_4$ and 0.09 N $Na_2SO_4$ was obtained through the discharge pipe 21a. The effluent from the anode chamber was separated from oxygen by the separator 23a and exhausted at a rate of 115 cc. per hour.

For the industrial embodiment of this mercury method, it is preferable to use a vertical rotating disc mercury electrolytic cell.

*Example 14*

An acid-base double membrane was used in this example and was prepared by the following method.

The solution prepared by mixing 3 parts of cyclohexane with 1 part of polyvinyl chloride was mixed with 3 parts of Amberlite IR-120 passing 200 mesh. Said mixture was formed into a sheet having a thickness of 0.5 mm. by means of a calender heated at 40° C. and then deprived of the solvent by alcohol, thereby a cation exchange membrane was prepared. By the same method as that above-mentioned, the anion exchange membrane was prepared from 3.5 parts of Amberlite IRA-410 and 1 part of polyvinyl chloride. The anion and cation exchange membranes prepared as above were joined by an adhering agent which was prepared by reacting a solution of 2.5 parts of polyethyleneimine, 6 parts of epichlorhydrin, 1.5 parts of Epon 828 and 6 parts of methylalcohol while stirring said mixed solution at a temperature of 30° C.-35° C. during about 30 minutes. Said joined membranes were hardened by keeping them for 24 hours at a temperature of 40° C. and then treating them with a 5% solution of caustic soda, whereby the acid-base double exchange membrane was obtained.

Figure 16:
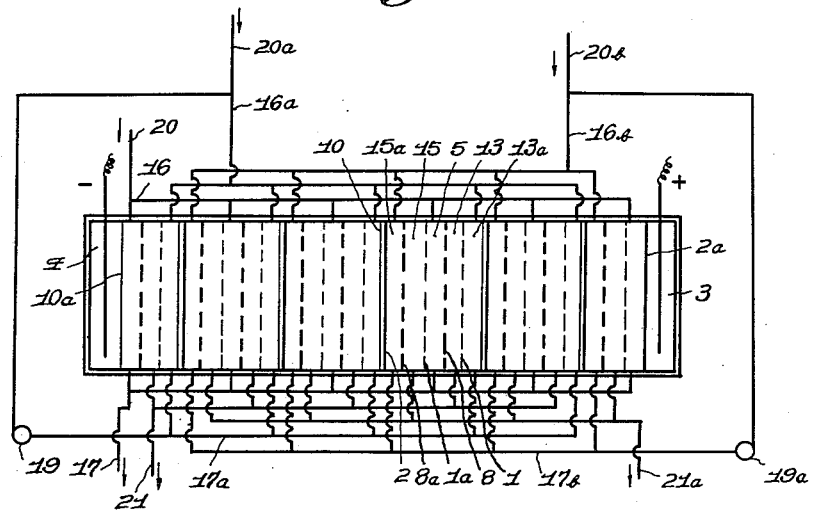
FIG. 16 is a schematic view of an electrolytic cell to which this invention is applied and in which acid and base solutions are produced from salt solutions by using a double membrane.

The electrolytic cell used in this example is shown in FIG. 16, in which the membrane (C-3), (A-9), (C-8), and (A-4) were used as the micro-porous ion exchange membranes respectively, 1, 8, 1a and 8a. In FIG. 16, sign 2 and 10 indicate, respectively, the anion exchange membrane of the acid-base double membrane and the cation exchange membrane. The micro-porous anion exchange membrane 8a and the microporous cation exchange membrane 1 were placed respectively adjacent the anion exchange membrane 2 and the cation exchange membrane 10 of the double membrane. The surface area of the membrane was selected so as to be 64 cm.² and five units were used. Said units were partitioned from the cathode compartment 4 by the cation exchange membrane 10a and from the anode compartment 3 by the anion exchange membrane 2a. A 0.5 N solution of NaCl was fed into the starting solution compartment 5 through the pipe 16 from the feed pipe 20 and then led out through the pipe 17. Water was fed into the diluted acid compartment 13a through the feed pipe 16a from the feed pipe 20a and then recycled by the pump 19 through the pipe 17a. On the other hand, water was fed into the diluted base compartment 15a through the feed pipe 20b through a pipe 16b and then recycled by the pump 19a through the pipe 17b. The acid solution produced in the concentrated acid compartment 13 was obtained from the discharge pipe 21. The base solution produced in the concentrated base compartment 15 was obtained from the discharge pipe 21a. Electrolysis was carried out by conducting a direct current of 1.3 a. at an electric voltage of 25 v. between anode and cathode made of graphite, while feeding a 0.5 N solution of NaCl into the feed pipe 20 at a rate of 1.6 l. per hour, feeding water into the feed pipes 20a and 20b at a rate of 33 cc. per hour, and recycling the solution by means of the pumps 19 and 19a at a rate of 10 l. per hour, whereby the mixed solution of 1.45 N NaOH and 0.26 N NaCl was obtained from the discharge pipe 21a at a rate of 130 cc. per hour and the mixed solution of 1.23 N HCl and 0.26 N NaCl was obtained from the discharge pipe 21 at a rate of 143 cc. per hour.

*Example 15*

The following description relates to the case in which partitions 1 and 8a, which partition the acid compartment and base compartment as illustrated in Example 14, are omitted. In this case, since the double membrane is directly in contact with a concentrated acidic or basic solution, the efficiency of the electrolysis is not high in the case of the manufacture of an acidic or basic solution of high concentration. However, according to this system, the acid or base produced by the double membrane can be obtained by the use of the micro-porous membrane without loss of the products.

In this example, the cell in FIG. 16 from which the membranes 1 and 8a were omitted was used as the electrolytic cell. Electrolysis was caried out by conducting a direct curent of 1.3 a. at an electric voltage of 21 v. between the anode and cathode, while feeding a 0.5 N solution of NaCl into the salt compartment through the feed pipe 20 at a rate of 840 cc. per hour and also feeding water into the acid compartment and the base compartment, respectively, through the feed pipes 20a and 20b, whereby a mixed solution containing 0.51 N NaOH and 0.07 N NaCl was obtained from the discharge pipe 21a and a mixed solution containing 0.48 N HCl and 0.10 N NaCl was obtained from the discharge pipe 21 at a rate of 400 cc. per hour.

*Example 16*

The membranes (A–3) and (C–5) were, respectively, used as the micro-porous anion exchange membrane 8 and the micro-porous cation exchange membrane 1 and these were arranged as shown in FIG. 10 so that the electrodialysis cell consisted of five dilute compartments 7, and four concentrate compartments 6. The effective surface area of each of said membranes was 8 cm. x 12 cm. Electrolysis was carried out by conducting a direct curent of 2 a. at an electric voltage of 6.4 v. between anode and cathode while feeding a 0.5 N solution of NaCl through the inlet pipe 16 into the dilute compartment 7 at a rate of 7 l. per hour and feeding a 0.5 N solution of NaCl into the electrode chambers 3 and 4, whereby the concentrated solution of 2.1 N NaCl could be obtained from the concentrate compartment 6 through the pipe 18 at a rate of 142 cc. per hour.

*Example 17*

In this example, the apparatus in FIG. 11 was used, in which the anode and cathode were made of graphite and the membranes (C–8), (A–11), (C–10) and (A–11) were, respectively, used as the barrier membranes 1, 2, 10 and 2a. The electrolytic cell was formed by arranging four units, each being composed of a successive arrangement of the above-mentioned membranes 1, 2, 10 and 2a. The surface area of each of said membranes was 96 cm.². A 0.5 N solution of NaCl and a 0.04 N solution of Ca(OH)₂ were, respectively, fed through the pipe 16 at a rate of 1.5 l. per hour and through the pipes 16a at a rate of 20 l. per hour. Water was fed through the pipes 16b and 16c, respectively, at a rate of 50 cc. per hour and at a rate of a 2 l. per hour. The hydraulic pressure of the solution of NaCl was selected so as to be higher than that of the other solution. The NaOH was led from the pipe 18 at a rate of 180 cc. per hour. The solution of NaCl and the solution of Ca(OH)₂, were removed, respectively, through the pipes 17 and 17a. Electrolysis was carried out by conducting a direct current of 2 a. at an electric voltage of 14.2 v. between anode and cathode, whereby a 1.3 N solution of NaOH and the solution of CaCl₂ was removed through the pipe 18 and the pipe 18a.

*Example 18*

In this example, the cell provided with an anode and cathode made of graphite which resembles the cell in FIG. 12 was used. The membrane (C–10), (C–8) and (A–11) were, respectively, used as the barrier membranes 10, 1 and 2. The surface area of each of said membranes was 96 cm.². The electrolytic cell was made of five units, each being composed of the above-mentioned barrier membranes 10, 1 and 2. A 0.5 N solution of NaCl, and a 0.04 N solution of Ca(OH)₂ were, respectively, fed through the pipes 16 and 16a at the rate of 2 l., and 25 l. per hour. Water was fed through the pipe 16b at a rate of 50 cc. per hour. The pressure of the solution of NaCl was maintained at a value higher than that of the other solution. The solution NaOH was removed through the pipe 18 at a rate of 220 cc. per hour. The reacted solutions of NaCl and Ca(OH)₂ were, respectively, removed through the pipes 17 and 17a. Electrolysis was carried out by conducting a direct current of 2 a. at a voltage of 15 v. between anode and cathode, whereby a 1.26 N solution of NaOH was obtained through the pipe 18.

While we have described particular embodiments of our invention, it will, of course, be understood that we do not wish our invention to be limited thereto, since many modifications may be made and we, therefore, contemplate by the appended claims to cover all such modifications as fall within the true spirit and scope of our invention.

We claim:

1. In the method for the production of acid and base solutions from a salt solution in a system comprising two electrodes and a plurality of units, each unit comprising an anion-exchange membrane, an acid-base double membrane and a cation-exchange membrane, at least one of said cation-exchange membrane and said anion exchange membrane being a porous ion-exchange membrane, and said acid-base double membrane being composed of a cation-exchange membrane and an anion exchange membrane, with said porous ion-exchange membrane being formed of ion-exchange resin and having uniformly distributed capillaries extending therethrough, the voidage and water permeability of said porous ion-exchange membrane being, respectively, 1–40% and 10–10,000 cc./dm.² hr. m. of water head, the anion exchange membrane, the cation exchange membrane side of said acid-base double membrane, the anion exchange membrane side of said acid-base double membrane and the cation exchange membrane being successively arranged from the cathode side, and an acid compartment being formed between the anion exchange membrane and the acid-base double membrane, a base compartment being formed between the acid-base double membrane and the cation exchange membrane, and a salt compartment being formed between the cation exchange membrane and the anion exchange membrane in each unit, the steps which comprise, introducing salt solution into the salt compartments in the system, passing direct electric current through said compartments and membranes, passing salt solution through the porous ion exchange membrane from the salt compartment selectively into the acid and the base compartments, and withdrawing acid solution from the acid compartment and base solution from the base compartment in each unit.

2. In the method according to claim 1, wherein each acid compartment is divided by a porous cation exchange membrane into a diluted acid compartment and a concentrated acid compartment and each base compartment is divided by a porous anion exchange membrane into a diluted base compartment and a concentrated base compartment, said diluted acid and base compartments being connected to the acid-base double membrane and said concentrated acid and base compartments being adjacent said diluted acid and base compartments, the steps comprising, introducing salt solution into the salt compartments in the system, passing direct electric current through said compartments and membranes, causing salt solution to flow through the porous ion exchange membrane from the salt compartment selectively into the acid and base compartments, introducing a fluid selected from the group consisting of water and dilute acid solution of the produced acid into each diluted acid compartment and introducing a fluid selected from the group consisting of water and dilute base solution of the produced base in each diluted base compartment, causing said diluted solution to flow through the porous ion exchange membrane from each diluted solution compartment to a concentrated acid or base solution compartment, withdrawing acid solution from the concentrated acid compartments and base solution from the concentrated base compartments in each unit.

3. In the method of concentration of an aqueous ionic solution in a system comprising two electrodes and a plurality of units, each unit comprising an anion-exchange membrane and a cation-exchange membrane, at least one of the ion-exchange membranes of said unit being a porous ion-exchange membrane, said porous ion-exchange membrane being formed of an ion-exchange resin and having uniformly distributed capillaries extending therethrough, the voidage and water permeability of said porous ion-exchange member being, respectively, 1–10% and 10–200 cc./dm.$^2$ hr. m. of water head, the anion-exchange membranes and the cation exchange membranes being alternately arranged and compartments being formed between pairs of said membranes, said compartments containing ionic solutions of high concentration and low concentration alternatively, the steps comprising, introducing an aqueous electrolytic solution into each compartment containing solution of low concentration, passing a direct electric current through said compartment and membrane assembly to cause the migration of ionic species in the aqueous ionic solution into the porous ion-exchange membrane, passing said ionic solution through said porous ion-exchange membrane from the compartments of low concentration to the compartments of high concentration, withdrawing concentrated ionic solution from each compartment of high concentration and withdrawing diluted ionic solution from each compartment of low concentration.

4. In the method for carrying out an electrochemical reaction in which two ionic solutions containing ionic species AY and BX, respectively, produced from two ionic solutions containing ionic species AX and BY, respectively, namely, the reaction represented by the equation $AX+BY=AY+BX$, in a system comprising two electrodes and plurality of units, each unit comprising a cation exchange membrane, an anion-exchange membrane, at least one of said membranes in each unit being a porous ion-exchange membrane, said porous ion-exchange membrane being formed of an ion-exchange resin and having uniformly distributed capillaries extending therethrough, the voidage and water permeability of said porous ion-exchange membrane being, respectively, 1–40% and 10–10,000 cc./dm.$^2$ hr. m. of water head, there being disposed successively in said system a cation-exchange membrane, an anion-exchange membrane, a cation exchange membrane and an anion-exchange membrane in each unit from the cathode side and forming compartments between pairs of said membranes, first, second, third, and fourth compartments in said unit each containing one of four solutions containing respectively said four ionic species, the steps comprising, introducing two aqueous ionic solutions having the ionic species AX and BY, respectively, into the first and third compartments, respectively, in each unit of said system, passing a direct electric current through said compartments and membranes to effect the migration of ionic species of said ionic solutions into the membranes, passing said ionic solution through said porous ion exchange membrane in the direction of migration of the ionic species into said membrane, withdrawing an ionic solution having the ionic species BX from the second compartment and withdrawing an ionic solution having the ionic species AY from the fourth compartment.

5. In the method for the production of a solution of a member of the group consisting of caustic alkali and alkali carbonate from a solution of an alkali metal salt and a solution of a member of the group consisting of a hydroxide, a carbonate and a bicarbonate, in a system comprising two electrodes and a plurality of units, each unit comprising a diaphragm, a cation exchange membrane and an anion-exchange membrane, said diaphragm having permselectivity, at least one of said membranes in each unit being a porous ion-exchange membrane, said porous ion exchange membrane being formed of an ion-exchange resin and having uniformly distributed capillaries extending therethrough, the voidage and water permeability of said porous ion exchange membrane being, respectively, 1–40% and 10–10,000 cc./dm.$^2$ hr. m. of water head, the diaphragm, the anion exchange membrane, and the cation-exchange membrane being successively arranged in each unit from the cathode side and forming compartments between pairs of membranes, first, second, and third compartments in each unit containing four solutions having said three ionic species respectively, the steps comprising, introducing the solution of a member of the group consisting of a hydroxide, a carbonate and a bicarbonate and the solution of alkali metal salt, respectively, into the first and third compartments, respectively, in the units of said system, passing a direct electric current through said compartments and membranes to effect the migration of the ionic species of said ionic solutions into the membranes, passing said ionic solution through said porous ion exchange membrane in the diretcion of migration of the ionic species into said membrane, and withdrawing the solution of a member of the group consisting of alkali metal hydroxide and alkali metal carbonate from the second compartment.

6. In the method of separating the constituents of an aqueous ionic solution in a system comprising two electrodes and a plurality of units, each unit comprising one group of anion-exchange membranes and one group of cation-exchange membranes, said groups consisting of at least one sheet of an ion-exchange membrane, at least one of said groups being porous ion-exchange membranes, said porous ion-exchange membranes being formed of an ion-exchange resin and having uniformly distributed capillaries extending therethrough, the voidage and water permeability of said porous ion-exchange membranes being, respectively, 1–40% and 10,000 cc./dm.$^2$ hr. m. of water head, said group of cation-exchange membranes and said group of anion-exchange membranes being alternately arranged and compartments being formed between pairs of said membranes, said compartments of each unit containing solutions having said constituents of an aqueous ionic solution in different relative proportions, the steps comprising, introducing an aqueous ionic solution into each unit of said system, passing a direct electric current through said compartments and membranes to effect the migration of constituents of said ionic solution into the porous ion-exchange membrane in each unit, passing said ionic solution through said porous ion-exchange membranes in the direction opposite to that of migration of the separated constituents of said ionic solution caused by said electric current, withdrawing solutions containing constituents in different relative proportions from at least two compartments in each unit, whereby the solution containing a large proportion of the constituents which have been caused to migrate more rapidly by said electric current is withdrawn from a compartment upstream relative to the direction of flow of the solution through said porous ion-exchange membrane and the solution containing a large proportion of the constituents which have been caused to migrate more slowly by said electric current is withdrawn from a compartment downstream relative to the direction of flow of solution through the porous ion-exchange membrane.

7. In the method of separating ionic species of like charge in an ionic solution in a system comprising two electrodes and a plurality of units, each unit comprising an ion-exchange membrane and one group of porous ion-exchange membranes, said group consisting of at least one sheet of a porous ion-exchange membrane, one of said ion-exchange membranes and said group of porous ion-exchange membranes having cation permeability and the other having anion permeability, said porous ion-exchange membranes being formed of an ion-exchange resin and having uniformly distributed capillaries extending therethrough, the voidage and water permeability of said porous ion-exchange membranes being, respectively, 1–40% and 10–10,000 cc./dm.$^2$ hr. m. of water head, said ion-exchange membranes and said group of porous ion-exchange membranes being alternately arranged and compartments being formed between pairs of said membranes, and said compartments of each unit containing solutions having said ionic species of aqueous ionic solution in different relative proportions, the steps comprising, introducing an aqueous ionic solution into each unit of said system, passing a direct electric current through said compartments and membranes to effect the migration of constitutents of said ionic solution into the porous ion-exchange membrane in each unit, passing said ionic solution through said porous ion-exchange membranes in the direction opposite to that of migration of the separated ionic species of said ionic solution caused by said electric current, withdrawing solutions containing ionic species in different relative proportions from at least two compartments in each unit, whereby the solution containing a large proportion of the ionic species which have been caused to migrate more rapidly by said electric current is withdrawn from a compartment upstream relative to the direction of flow of solution through the porous ion-exchange membrane and the solution containing a large proportion of the ionic species which has been caused to migrate more slowly by said electric current is withdrawn from a compartment downstream relative to the direction of flow of solution through the porous ion-exchange membrane.

8. In the method of separating the ionic species and non-electrolyte of an aqueous ionic solution in a system comprising two electrodes and a plurality of units, each unit comprising an anion exchange membrane and a cation exchange membrane, at least one of said membranes being porous ion-exchange memberanes, said porous ion-exchange membranes being formed of an ion-exchange resin and having uniformly distributed capillaries extending therethrough, the voidage and water permeability of said porous ion-exchange membranes being, respectively, 1–40% and 10–10,000 cc./dm.$^2$ hr. m. of water head, said cation exchange membranes and said anion-exchange membranes being alternately arranged and compartments being formed between pairs of said membranes, and said compartments of each unit containing solutions having said constituent of the aqueous ionic solution in different relative proportions, the steps comprising, introducing an aqueous ionic solution into each unit of said system, passing a direct electric current through said compartments and membranes to effect the migration of constituents of said ionic solution into the porous ion-exchange membrane in each unit, passing said ionic solution through said porous ion-exchange membranes in the direction opposite to that of migration of the separated constituents of said ionic solution caused by said electric current, withdrawing solutions containing constituents in different relative proportions from at least two compartments in each unit, whereby the solution containing a large proportion of the ionic species is withdrawn from a compartment upstream relative to the direction of flow of solution through the porous ion-exchange membrane and the solution containing a large proportion of the non-electrolyte is withdrawn from a compartment downstream relative to the direction of flow of solution through the porous ion-exchange membrane.

9. In the method of separating the non-electrolytes contained in an aqueous ionic solution in a system comprising two electrodes and a plurality of units, each unit comprising one group of anion exchange membranes and one group of cation-exchange membranes, each group consisting of at least one sheet of an ion-exchange membrane, and at least one of said groups being porous ion-exchange membranes, said porous ion-exchange membranes being formed of an ion-exchange resin and having uniformly distributed capillaries extending therethrough, the voidage and water permeability of said porous ion-exchange membranes being, respectively, 1–40% and 10–10,000 cc./dm.$^2$ hr. m. of water head, said group of cation-exchange membranes and said group of anion exchange membranes being alternately arranged and compartments being formed between pairs of said membranes, said compartments of each unit containing solutions having the constituents of the aqueous ionic solution in different concentrations, the steps which comprise introducing an aqueous ionic solution into each unit of said system, passing a direct electric current through said compartments and membranes to effect the migration of constituents of said ionic solution into the porous ion-exchange membrane in each unit, passing said ionic solution through said porous ion-exchange membranes in the direction opposite to that of migration of the separated constituents of said ionic solution caused by said electric current, withdrawing solutions containing constituents in different relative proportions from at least two compartments in each unit, whereby the solution containing a large proportion of the non-electrolyte which has been caused to migrate more rapidly by said electric current is withdrawn from a compartment upstream relative to the direction of flow of solution through the porous ion-exchange membrane and the solution containing a large proportion of the non-electrolyte which has been caused to migrate more slowly by said electric current is withdrawn from a compartment downstream relative to the direction of flow of solution through the porous ion-exchange membrane.

10. In the method of preventing leakage of an electrolytic product from an electrode chamber into an adjacent chamber during electrolysis in an electrolytic cell, said cell comprising two chambers, at least one porous ion-exchange membrane being used as a diaphragm which divides said electrode chamber and its adjacent chamber, a porous cation-exchange membrane being used as the diaphragm when said electrode chamber is a cathode chamber, and a porous anion-exchange membrane being used as the diaphragm when said electrode chamber is an anode chamber, said porous ion-exchange membrane being made of an ion-exchange resin and having uniformly distributed capillaries extending therethrough, the voidage and permeability of said porous ion-exchange membrane being, respectively, 1–40% and 10–10,000 cc./dm.$^2$ hr. m. of water head, the steps comprising, introducing an electrolytic solution into said electrolytic cell, passing a direct electric current through said porous ion-exchange membrane and said chambers from anode to cathode, the electrolytic solution being passed through said porous ion-exchange memberane from said adjacent chamber to said electrode chamber, and withdrawing solution containing the electrolysis product from said electrode chamber.

11. In the method of preventing leakage of an electrolytic product from an electrode chamber into an adjacent chamber during electrolysis in an electrolytic cell, said cell comprising two chambers, and a porous cation-exchange membrane being used as the diaphragm disposed between said electrode cathode chamber and its adjacent chamber, said electrode chamber being a cathode chamber and the chamber adjacent said electrode chamber being an anode chamber, said porous cation-exchange membrane being made of cation-exchange resin and having uniformly distributed capillaries extending therethrough, the voidage and permeability of said porous cation exchange membrane being, respectively, 1–40% and 10–10,000 cc./dm.$^2$ hr. m. of water head, the steps comprising, introducing an electrolytic solution into said electrolytic cell, passing a direct electric current through said porous cation-exchange membrane and said chambers from anode to cathode, the electrolytic solution being passed through said porous cation-exchange membrane from said anode chamber to said cathode chamber, and withdrawing solution containing the electrolysis product from said cathode chamber.

12. In the method of preventing leakage of an electrolytic product from an electrode chamber into an adjacent chamber during electrolysis in an electrolytic cell, said cell comprising three chambers, a porous cation-exchange membrane being used as the diaphragm disposed between a cathode chamber and a middle chamber, and a porous anion-exchange membrane being used as the diaphragm disposed between an anode chamber and the middle chamber, said porous ion exchange membrane being made of an ion-exchange resin and having uniformly distributed capillaries extending therethrough, the voidage and permeability of said porous ion-exchange membrane being, respectively, 1–40% and 10–10,000 cc./dm.$^2$ hr. m. of water head, the steps comprising, introducing an electrolytic solution into said electrolytic cell, passing a direct electric current through said porous ion-exchange membrane and said chambers from anode to cathode, the electrolytic solution being passed through said porous ion-exchange membrane from said middle chamber to said electrode chamber, and withdrawing solution containing the electrolysis product from said electrode chamber.

13. In the method of preventing leakage of an electrolytic product from an electrode chamber into an adjacent chamber during electrolysis in an electrolytic cell, said cell comprising two chambers, and a porous anion-exchange membrane being used as the diaphragm disposed between a cathode chamber and an anode chamber, said porous anion-exchange membrane being made of an anion exchange resin and having uniformly distributed capillaries extending therethrough, the voidage and permeability of said porous anion-exchange membrane being, respectively, 1–40% and 10–10,000 cc./dm$^2$ hr. m. of water head, the steps comprising, introducing an electrolytic solution into said electrolytic cell, passing an electrolytic solution into said electrolytic cell, passing a direct electric current through said porous anion-exchange membrane and said chambers from anode to cathode, the electrolytic solution being passed through said porous anion-exchange membrane from said cathode chamber to said anode chamber, and withdrawing solution containing the electrolysis product from said anode chamber.

14. In the method for carrying out electrochemical reactions relating to the separation of the constituents of an aqueous ionic solution, the production of acid and base solutions from a salt solution, the concentration of an aqueous ionic solution, and the double decomposition of aqueous ionic solutions, in a system comprising two electrodes and a plurality of units, each unit comprising at least one cation-exchange membrane, and at least one anion-exchange membrane, at least one of said ion-exchange membranes in each of said units being a porous ion-exchange membrane, said porous ion-exchange membrane being formed of an ion-exchange resin and having uniformly distributed capillaries extending therethrough, the voidage and water permeability of said porous ion-exchange membrane being, respectively 1–40% and 10–10,000 cc./dm.$^2$ hr. m. of the water head, compartments being formed between pairs of said membranes and containing solutions having substantially different ionic species, the steps of introducing at least one aqueous ionic solution into each unit of said system, passing a direct electric current through said compartments and membranes to effect the migration of the constituents of said ionic solution into porous ion-exchange membranes, said ionic solution being passed through said porous ion-exchange membranes in each unit, and withdrawing solution containing constituents in different relative proportions from at least two compartments in each unit.

15. In the method for the production of a solution of a member of the group consisting of caustic alkali and alkali carbonate from a solution of an alkali metal salt and a solution of a member of the group consisting of a hydroxide, a carbonate and a bicarbonate, in a system comprising two electrodes and a plurality of units, each unit comprising a diaphragm, a cation exchange membrane and an anion-exchange membrane, said diaphragm having non-permselectivity, at least one of said membranes in each unit being a porous ion-exchange membrane, said porous ion-exchange membrane being formed of an ion-exchange resin and having uniformly distributed capillaries extending therethrough, the voidage and water permeability of said porous ion-exchange membrane being, respectively, 1–40% and 10–10,000 cc./dm.$^2$ hr. m. of water head, the diaphragm, the anion-exchange membrane, and the cation-exchange membrane being successively arranged in each unit from the cathode side and forming compartments between pairs of membranes, first, second, and third compartments in each unit containing four solutions having said three ionic species respectively, the steps comprising, introducing the solution of a member of the group consisting of a hydroxide, a carbonate and a bi-carbonate and the solution of alkali metal salt, respectively, into the first and third compartments, respectively, in the units of said system, passing a direct electric current through said compartments and membranes to effect the migration of the ionic species of said ionic solutions into the membranes, passing said ionic solution through said porous ion exchange membrane in the direction of migration of the ionic species into said membrane, and withdrawing the solution of a member of the group consisting of alkali metal hydroxide and alkali metal carbonate from the second compartment.

16. In the method for carrying out electrochemical reactions relating to the separation of the constituents of an aqueous ionic solution, the production of acid and base solutions from a salt solution, the concentration of an aqueous ionic solution, and the double decomposition of aqueous ionic solutions, in a system comprising two electrodes and a plurality of units, each unit comprising at least one cation-exchange membrane, and at least one anion-exchange membrane, at least one of said ion-exchange membranes in each of said units being a porous ion-exchange membrane, said porous ion-exchange membrane being formed of an ion-exchange resin and having uniformly distributed capillaries extending therethrough, the voidage and water permeability of said porous ion-exchange membrane being, respectively 1–40% and 10–10,000 cc./dm.$^2$ hr. m. of the water head, compartments being formed between pairs of said membranes and containing solutions having substantially different ionic concentrations, the steps of introducing at least one aqueous ionic solution into each unit of said system, passing a direct electric current through said compartments and membranes to effect the migration of the constituents of said ionic solution into porous ion-exchange membranes, said ionic solution being passed through said porous ion-exchange membranes in each unit, and withdrawing solution containing constituents in different relative proportions from at least two compartments in each unit.

17. A process as defined in claim 9, wherein said solution is heavy water.

18. A process as defined in claim 8, wherein the solution is a sugar solution containing said electrolyte.

19. A process as defined in claim 12, wherein said electrolyte solution is a solution of alkali metal salts.

20. A process as defined in claim 11, wherein said electrolyte solution is a solution of an alkali metal chloride.

21. A process as defined in claim 13, wherein said electrolyte solution is a solution of an alkali metal salt.

References Cited in the file of this patent

UNITED STATES PATENTS

| | | |
|---|---|---|
| 2,342,230 | Weber et al | Feb. 22, 1944 |
| 2,566,308 | Brewer | Sept. 4, 1951 |
| 2,741,591 | Dewey | Apr. 10, 1956 |
| 2,820,756 | Wyllie | Jan. 21, 1958 |
| 2,829,095 | Oda | Apr. 1, 1958 |
| 2,835,632 | Kollsman | May 20, 1958 |
| 2,848,403 | Rosenberg | Aug. 19, 1958 |
| 2,854,394 | Kollsman | Sept. 30, 1958 |

OTHER REFERENCES

Fortune, vol. 44, page 109.